(12) United States Patent
Herrmann et al.

(10) Patent No.: US 8,991,276 B2
(45) Date of Patent: Mar. 31, 2015

(54) HYDRAULIC SYSTEM FOR ACTUATING AT LEAST ONE SHIFTING ELEMENT OF A TRANSMISSION

(75) Inventors: Markus Herrmann, Scheidegg (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 346 days.

(21) Appl. No.: 13/539,528

(22) Filed: Jul. 2, 2012

(65) Prior Publication Data
US 2013/0025396 A1    Jan. 31, 2013

(30) Foreign Application Priority Data

Jul. 26, 2011  (DE) .......................... 10 2011 079 850

(51) Int. Cl.
F16H 3/00     (2006.01)
F16H 61/02    (2006.01)
F16H 61/06    (2006.01)

(52) U.S. Cl.
CPC ....... *F16H 61/0251* (2013.01); *Y10T 74/20024* (2013.01); *F16H 2061/0253* (2013.01); *F16H 61/061* (2013.01)
USPC .............................. 74/335; 137/637; 137/112

(58) Field of Classification Search
CPC ................... F16K 99/0028; F16H 2061/0253; F16H 61/061; F16H 61/0251
USPC ...................... 74/335; 137/636, 637, 109, 112
See application file for complete search history.

(56) References Cited

U.S. PATENT DOCUMENTS

| 3,137,311 | A | * | 6/1964 | Rohweder et al. ............. 137/495 |
| 3,840,039 | A | * | 10/1974 | Shellman .................... 137/116.3 |
| 4,620,560 | A | * | 11/1986 | Coutant ................... 137/115.14 |
| 4,672,862 | A | * | 6/1987 | Chana ........................... 475/125 |
| 4,890,517 | A | | 1/1990 | Ueki et al. |
| 5,129,500 | A | | 7/1992 | Potter |
| 6,463,959 | B2 | | 10/2002 | Kremer |
| 7,282,005 | B2 | | 10/2007 | Shimizu et al. |
| 2012/0304816 | A1 | * | 12/2012 | Yagi ............................. 74/665 B |
| 2013/0333508 | A1 | * | 12/2013 | Lundberg et al. .......... 74/473.11 |

FOREIGN PATENT DOCUMENTS

| DE | 38 41 304 A1 | 1/1990 |
| DE | 101 04 101 A1 | 8/2001 |
| JP | 2-085567 A | 3/1990 |

* cited by examiner

*Primary Examiner* — David M Fenstermacher
(74) *Attorney, Agent, or Firm* — Davis & Bujold, PLLC; Michael J. Bujold (57) ABSTRACT

A hydraulic system (1) for actuating at least one shifting element (2) of a transmission. The hydraulic system comprises a regulating valve device (3) that can be preset and has a regulating valve slide (8), and a shifting valve device (4) which can also be preset and has a shifting valve slide (6). The shifting valve device (4) interacts with the regulating valve device (3). The regulating valve slide (8) and the shifting valve slide (6) are coaxially aligned with one another and move in opposite longitudinal directions within a common boring (24) of a housing (25). Each of the slides has a control surface (5, 14) which faces toward one another and can be pressurized with a pressure signal (p_VS) via a common pressure chamber (26).

19 Claims, 5 Drawing Sheets

HYDRAULIC SYSTEM FOR ACTUATING AT LEAST ONE SHIFTING ELEMENT OF A TRANSMISSION

This application claims priority from German patent application serial no. 10 2011 079 850.1 filed Jul. 26, 2011.

FIELD OF THE INVENTION

The invention relates to a hydraulic system for actuating at least one shifting element of a transmission.

BACKGROUND OF THE INVENTION

The document U.S. Pat. No. 7,282,005 B2 discloses a hydraulic system for actuating a shifting element of a transmission having a regulating valve device, which can be preset and has a regulating valve slide, and a shifting valve device, which is in effective connection thereto, and also can be preset, as well as being formed having a shifting valve slide. The pilot pressure for the regulating valve device and the shifting valve device is preset by a pressure regulating device depending on an electrical control signal, wherein the pressure regulating device has a defined working pressure range that is typically significantly lower than the actuating pressure of the shifting element. In order to be able to actuate the shifting element with higher pressure values compared to the pilot pressure of the regulating valve device and the shifting valve device, the regulating valve device is connected downstream of the pressure regulating device, in the region in which the pilot pressure of the pressure regulating device is converted to a higher level.

In general, during driving operation of a vehicle that is implemented having a transmission such as a torque-converter transmission or the like, it should be guaranteed that the shifting element in the completely engaged operating state is operated slip-free and has the full transfer capability thereof. For this purpose, the actuating pressure at the end of the regulating pressure range of the actuating pressure is increased step-like to a higher pressure value that corresponds to a so-called system pressure. The changeover, or the at least nearly step-like increase of the actuating pressure is implemented via the shifting valve device controlled in parallel by the pressure regulating device; the shifting valve device, however, is actuated, or transferred, out of a first shift state into a second shift state only at high pilot pressures.

The feedback from the actuating pressure to the regulating valve device is deactivated via the shifting valve device upon presence of a second shift state of the shifting valve device, so that the regulating valve device is transferred out of a so-called modulation position into an operating state, in which the system pressure present at the regulating valve device is completely passed through in the direction of the shifting element.

Because a regulating valve slide of the regulating valve device and a shifting valve slide of the shifting valve device are respectively disposed in separate valve borings, a hydraulic system formed in such a manner has an undesirably high construction space requirement.

SUMMARY OF THE INVENTION

Therefore, the problem addressed by the present invention is to provide a hydraulic system that is efficient with respect to construction space, by means of which a shifting element of a transmission can be actuated.

The hydraulic system according to the invention for actuating at least one shifting element of a transmission is designed having a regulating valve device that can be preset and that has a regulating valve slide, and a shifting valve device operatively connected with it that can also be preset and is designed having a shifting valve slide.

According to the invention, the regulating valve slide and the shifting valve slide are disposed in a construction space-efficient manner in a common boring of a housing, coaxial to each other and movable in opposing longitudinal directions, and a pressure signal can be applied in the region of control surfaces, facing each other, via a common pressure chamber.

With this, the hydraulic system according to the invention is characterized by a more compact construction compared to solutions known from the prior art, whereby transmissions implemented with the hydraulic system can also be implemented with small dimensions and then have a low total weight.

In an advantageous embodiment of the hydraulic system according to the invention, the regulating valve slide and the shifting valve slide can each be held by means of a stop device in a defined starting position that they preferably occupy in a pressure-less operating state of the hydraulic system. This way, it is guaranteed that during the startup of a vehicle, the regulating valve slide and the shifting valve slide each have a slide position equivalent to a defined operating state of the regulating valve device and the shifting valve device, and the vehicle can be started with a defined operating state of the hydraulic system.

If a return spring force is applied to the regulating valve slide via a spring device acting in the direction of the defined starting position thereof, then the regulating valve slide can be transferred into the defined starting position thereof with a small amount of control and regulating effort.

In a further construction space-efficient embodiment of the hydraulic system according to the invention, a further pressure signal can be applied at the shifting valve slide acting in the direction of the defined starting position thereof; the shifting valve slide can be transferred into the defined starting position thereof by means of the further pressure signal without an additional spring device increasing the need for construction space.

If the further pressure signal can be applied in the region of an effective surface of an additional piston disposed in the boring, longitudinally movable and coaxial to the shifting valve slide, where the additional piston can be brought into effective connection to the shifting valve slide, then the shifting element can be actuated with higher control quality because the shifting valve slide can be implemented having a shorter axial length due to the arrangement of the additional piston, and an actuating hysteresis of the shifting valve device is low due to lower manufacturing tolerance-dependent frictional forces between the shifting valve slide and a housing of the shifting valve device. This is due to the fact that transverse forces acting on the shifting valve slide that result from coaxial geometry errors between the common boring and a piston collar of the shifting valve slide acting together with it, are nearly zero.

In a further advantageous embodiment of the hydraulic system according to the invention, in the region of the shifting valve device, the additional piston is disposed in a sealing sleeve provided in the boring, and the pressure signal can be applied thereto via a channel in the sealing sleeve. With this, a transmission ratio of the shifting valve slide of the shifting valve device can be set in a simple manner for dimensioning the actuating pressure of the shifting valve device depending on the application case, without costly constructive measures.

For setting the actuating pressure of the shifting valve device depending on the respective application case, it only necessary to vary an inner diameter of the sleeve accommodating the additional piston in a longitudinally movable manner, and an outer diameter of the additional piston interacting with it, which defines the effective surface of the additional piston to which a pressure signal can be applied. Because the actuating pressure of the shift valve device is independent of the outer diameter of the sealing sleeve disposed in the common boring, the diameter of the common boring and the outer diameter of the sealing sleeve need not be changed for setting the actuating pressure of the shift valve device, whereby the manufacturing costs are reduced.

If an actuating pressure of the shifting element can be regulated via the regulating valve device within a defined pilot pressure range and with the presence of a first shift state of the shifting valve device, and if, above a pilot pressure value that can be applied to a first effective surface of a valve slide of the shifting valve device, the shift valve device has a second shift state, in which the actuating pressure of the shifting element corresponds to a system pressure that can be applied to the regulating valve device, then a shifting element that can be actuated via the hydraulic system according to the invention can be represented in a completely engaged operating state to the desired extent in a slip-free operating state.

In an embodiment of the hydraulic system according to the invention distinguished by low control and regulation costs, the actuating pressure of the shifting element can be applied at a first effective surface of the regulating valve slide of the regulating valve device in an effective direction that reduces the actuating pressure.

If the first effective surface of the regulating valve slide, to which the actuating pressure can be applied, is a differential area between two effective surfaces of the regulating valve slide that delimit a reduced diameter region of the regulating valve slide in the axial direction, via which the actuating pressure can be jointly set using shifting tongues, the construction space requirement of the regulating valve device is less than those of the designs known in practice, in which the first effective surface is provided in the region of a separate, or additional valve collar, which can only be implemented via a great axial length of the regulating valve side, because the axial length of the regulating valve slide is shorter. With this, the regulating valve device of the hydraulic system according to the invention has good control characteristics which are improved as compared with known solutions due to transverse forces acting to a lesser extent on a shorter implementation of the valve slide. The transverse forces result, among other reasons, from deformations of a housing of the regulating valve device and manufacturing tolerances which degrade the operating characteristics of the regulating valve slide in the valve housing of the regulating valve device.

The first effective surface of the regulating valve slide representing an integrated return surface results, however, in an inability to switch off the pressure applied to the first effective surface of the regulating valve slide without additional measures, as in known solutions, and the regulating valve slide of the regulating valve device must be transferred into an operating state through an additional measure, in which the actuating pressure of the shifting element takes on a value that guarantees a slip-free operating state of the shifting element.

In an embodiment of the hydraulic system according to the invention that can be produced in a constructively simple and economical manner, when the second shift state of the shifting valve device exists on the regulating slide valve, a total force component corresponding to at least the sum of a first force component equivalent to a pressure signal present at a second effective surface of the regulating valve slide and a second force component equivalent to the actuating pressure present at the first effective surface of the regulating valve slide, acts on the regulating valve slide, guiding the regulating valve slide in the direction of a position in which the actuating pressure is the same as the system pressure.

In an advantageous embodiment of the hydraulic system according to the invention, the actuating pressure of the shifting element in the second shift state of the shifting valve device is fed back to the second effective surface of the regulating valve slide as a pressure signal from the regulating valve device via the shifting valve device. With this, the actuating pressure of the shifting element can be increased, depending on the operating state, to the pressure level required for slip-free operation of the shifting element in a construction space-saving and economical manner without additional pressure regulators.

If the system pressure in the second shift state of the shifting valve device is applied as a pressure signal to the second effective surface of the regulating valve slide, the regulating valve device is reliably overridden and the regulating function of the regulating valve device is deactivated, whereby the actuating pressure of the shifting element above the pilot pressure value that can be applied to the first effective surface is no longer regulated, but rather corresponds to the system pressure and is reliably operated slip-free in the engaged operating state.

If in contrast, in the second shift state of the shifting valve device, the actuating pressure of the shifting element, or the pilot pressure of the regulating valve device, is applied as a pressure signal to the second effective surface of the regulating valve slide, the regulating valve device in the second shift state of the shifting valve device is reliably overridden and the regulating function of the regulating valve device is deactivated and the shifting element is pressurized with the actuating pressure required for the slip-free operation of the shifting element in the engaged operating state.

In an embodiment of the hydraulic system according to the invention that saves construction space and costs, the pilot pressure of the shifting valve device and the regulating valve device can be set via a common pressure regulating device.

If a pressure regulating valve slide of the pressure regulating device is disposed coaxially to the shifting valve slide and to the regulating valve slide in the common boring, the hydraulic system according to the invention is implemented in a particularly construction space-saving manner.

Features specified in the following example embodiments of the hydraulic system according to the invention are suitable for further developing the subject matter according to the invention either alone or in any arbitrary combination. The respective combinations of features with respect to the further development of the subject matter according to the invention do not represent limitations, but rather merely comprise examples.

BRIEF DESCRIPTION OF THE DRAWINGS

Further advantages and advantageous embodiments of the hydraulic system according to the invention arise from the example embodiments described in the following, based in principle on the drawings, where for the sake of clarity, in the description of the different example embodiments, components that are the same or functionally equivalent are provided with the same reference numbers. They show.

DETAILED DESCRIPTION OF THE PREFERRED EMBODIMENTS

Figure 1:
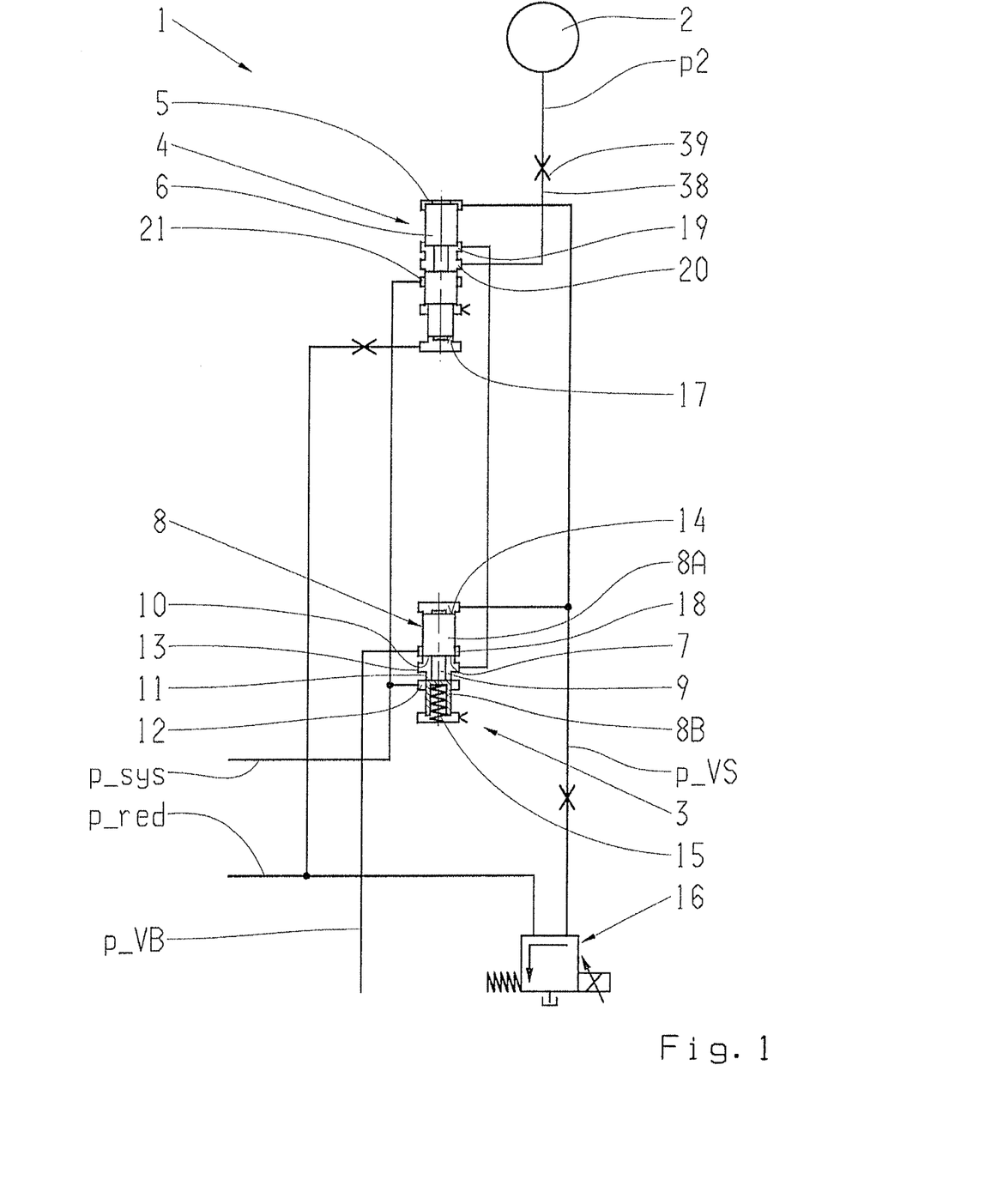
FIG. 1 a part of a first embodiment of the hydraulic system according to the invention.

FIG. 1 shows a part of a first example embodiment of a hydraulic system 1 for actuating a shifting element 2 of the transmission device, wherein the present shifting element 2 is a friction clutch of the transmission device that can be hydraulically actuated. Depending on an actuating pressure p2 that can be applied to the shifting element 2, a transfer capability of the shifting element 2 can be varied between a value equal to zero and a maximum value.

The actuating pressure p2 of the shifting element 2 can be adjusted via a regulating valve device 3 that can be preset, and a shifting valve device 4 that can also be preset and is in effective connection thereto. Here, the actuating pressure p2 of the shifting element 2 can be regulated within a defined pilot pressure range via the regulating valve device 3, and when in a first shift state of the shifting valve device 4, represented in FIG. 1. Above a pilot pressure value present at a first effective surface 5 of a shifting valve slide 6 of the shifting valve device 4, the shifting valve device 4 has a second shift state in which the actuating pressure p2 of the shifting element 2 corresponds to a system pressure p_sys that can be applied to the regulating valve device 3.

The actuating pressure p2 of the shifting element 2 can be applied to first effective surface 7 of a regulating valve slide 8 of the regulating valve device 3 in an effective direction reducing the actuating pressure p2. The first effective surface 7 of the regulating valve slide 8, to which the actuating pressure p2 can be applied, is a differential area between two effective surfaces 10, 11 of the regulating valve slide 8 delimiting a reduced diameter range 9 of the regulating valve slide 8 in an axial direction, by means of which the actuating pressure p2 can be set jointly with shifting tongues 12, 13.

This means that the effective surface 7 corresponds to a differential surface, or a feedback surface, that results from the difference between a first collar 8A of the regulating valve slide 8 and an effective surface of a second collar 8B of the regulating valve slide 8, wherein the first collar 8A has a larger diameter than a second collar 8B.

In the case of a second shift state of the shifting valve device 4, a total force component corresponding to at least a sum of a first force component equivalent to a pressure signal p_VS present at a second effective surface 14 of the regulating valve slide 8, and a second force component equivalent to the actuating pressure p2 applied at the first effective surface 7 of the regulating valve slide 8 and a spring force of a spring device 15, acting on the regulating valve slide 8, act on the regulating valve slide 8, guiding the regulating valve slide 8 in the direction of a slide setting in which the actuating pressure p2 is the same as the system pressure p_sys, wherein the spring force of the spring device 15 here has no effect on the basic function of the regulating valve device 3, but rather merely causes a shift of the working range of the regulating valve device 3.

In addition to the shifting valve device 4 and the regulating valve device, the hydraulic system 1 has a pressure regulating device 16 in the range of which the pilot pressure p_VS is preset controlled depending on electrical control signals.

In the pressureless operating state of the hydraulic system 1, the shifting valve slide 6 is pushed by a reducing pressure p_red present at an effective surface 17 of the shifting valve slide 6, and the regulating valve slide 8 is pushed by a spring device 15 respectively into a defined starting position, wherein here a pressureless state of the hydraulic system 1 is understood fundamentally to be a pilot pressure value of essentially zero output by the pressure regulating device 16. The reducing pressure p_red present at the pressure regulating device 16 represents the supply pressure of the pressure regulating device 16. Depending on a supply of the pressure regulating device 16, the pilot pressure p_VS has values between zero and the supply pressure, or the reducing pressure p_red, as a maximum value. The named pressureless operating state of the hydraulic system 1 avoids both a pre-fill pressure p_VB present at the regulating valve device 3 in the area of a further shifting tongue 18 as an actuating pressure p2 is transmitted via the regulating valve device 3 in the direction of the shifting element 2, and an emptying of the shifting element 2, which in the presence of the pre-fill pressure p_VB is in the disengaged operating state.

If the pilot pressure p_VS is set via the pressure regulating device 16 within the predefined pilot pressure range, which lies below the pilot pressure value at which the shifting valve device 4 transitions from the first shifting position represented in FIG. 1 into the second completely transitioned shift state, the pilot pressure p_VS is also applied to the second the surface 14 of the regulating valve slide 8, and pushes the regulating valve slide counter to the spring force of the spring device 15. With the increasing displacement of the regulating valve slide 8, the shifting tongue 12 at which the system pressure p_sys is present, is increasingly connected to the shifting tongue 13, via which an adjustable pressure that can be regulated in the range of the regulating valve device 3 can be applied to a shifting tongue 19 of the shifting valve device 4. The set pressure that is present in the region of the shifting tongue 19 of the shifting valve device 4 and is regulated via the regulating valve device 3, is in the first shift position of the shifting valve device 4 transmitted via a further shifting tongue 20 of the shifting valve device 4 in the direction of the shifting element 2, as an actuating pressure p2.

With the opening of the shifting tongue 12 of the regulating valve device 3, a pressure that is dependent on the system pressure p_sys and the setting of the regulating valve slide 8 is present at the differential surface 7 of the regulating valve slide 8; this pressure pushes the regulating valve slide 8 counter to the pilot pressure p_VS present at the second effective surface 14 to an extent that reduces the actuating pressure p2 until there is a balance of forces at the regulating valve slide 8. Via the respectively arising force equilibrium that is acting on the regulating valve slide 8, the regulating valve device 3 regulates, within the preset pilot pressure range, the actuation pressure p2 of the shifting element 2 that is preset in each case via the pilot pressure p_VS, where with continuous increase of the pilot pressure p_VS the actuation pressure p2 is increased proportionally.

In order to allow the slip-free operation of the shifting element 2 in the predefined operating states of the transmission device, the actuating pressure p2 should be regulatable by the regulating valve device 3 only up to a defined pressure level of the pilot pressure p_VS. Furthermore, the actuating pressure p2 of the shifting element 2 should correspond to the system pressure p_sys.

For this purpose, starting from the first shift position shown in FIG. 1, above the defined pilot pressure value of the pilot pressure p_VS, the shifting valve device 4 switches against the reducing pressure p_red present at the effective surface 17 of the shifting valve slide 6. For this, the effective surface 5 of the shifting valve slide 6 is designed larger than the effective surface 17. In the second shift position of shifting valve device 4, the system pressure p_sys present in the region of the shifting valve device 4 at a further shifting tongue 21 of the shifting valve device 4 is transmitted via the shifting tongue 20 of the shifting valve device 4 directly in the direction of the shifting element 2. At the same time, the shifting tongue 19 in the second shift position of the shifting valve device 4, in the region of which the pressure regulated by the regulating valve device 3 prevails, is blocked by the shifting valve slide 6. This means that the actuating pressure p2 in the second shifting position of the shifting valve device 4, in which the regulating valve device is not disposed in the hydraulic supply path of the shifting element 2, corresponds to the system pressure p_sys, although the regulating function of the regulating valve device 3 is active as before. With this, the shifting element 2 in the latter operating state of the hydraulic system 1 has the full transmission capability thereof and can be operated slip-free.

Figure 2:
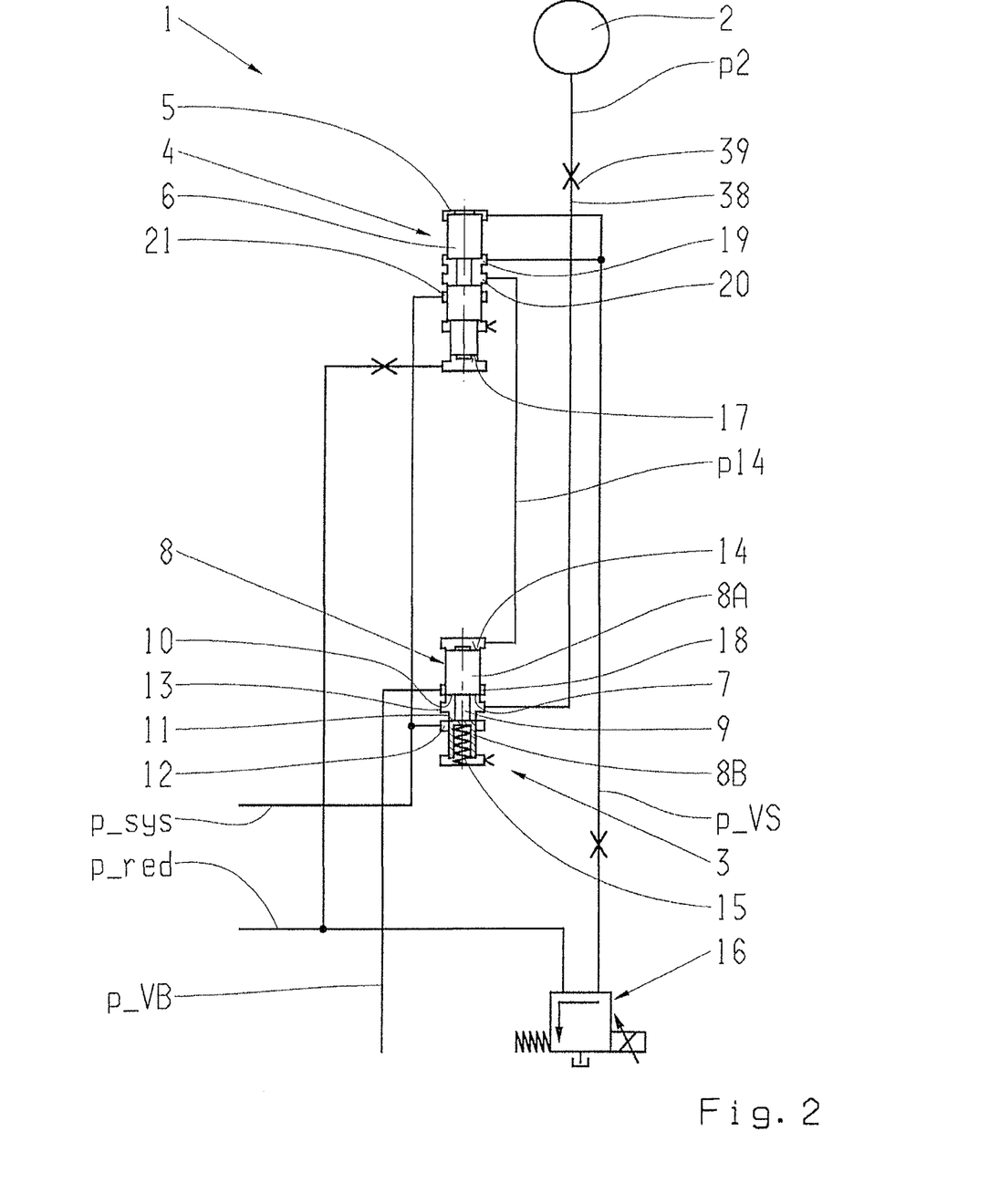
FIG. 2 a representation corresponding to FIG. 1, of a second embodiment of the hydraulic system according to the invention.

FIG. 2 shows a representation corresponding to FIG. 1, of a second example embodiment of the hydraulic system 1, the basic design of which corresponds to the first example embodiment of the hydraulic system according to FIG. 1, which is why in the following description substantially only the differences of the embodiments are described, and for the remaining function of the hydraulic system according to FIG. 2, reference is made to the description of FIG. 1.

With the hydraulic system 1 according to FIG. 2, the pilot pressure p_VS is not applied directly to the second effective surface 14 of the regulating valve slide 8, but rather, in the first shift state of the shifting valve device 4 shown in FIG. 2, is further transmitted by the shifting tongue 19 and the further shifting tongue 20 that is connected thereto in the direction of the second effective surface 14 of the regulating valve slide 8, and pushes the regulating valve slide 8 counter to the spring force of the spring device 15, wherein with increasing displacement of the regulating valve slide 8, the shifting tongue 12 of the regulating valve device 3, at which the system pressure p_sys is applied, is increasingly connected to the shifting tongue 13 of the regulating valve device 3, via which the adjustable actuating pressure p2 that can be regulated in the range of the regulating valve device 3 is applied to the shifting element 2.

With the opening of the shifting tongue 12 of the regulating valve device 3, a pressure that depends on the system pressure p_sys and the setting of the regulating valve slide 8 is present at the differential surface 7 of the regulating valve slide 8; this pressure pushes the regulating valve slide 8 counter to the pilot pressure p_VS present at the second effective surface 14 to an extent reducing the actuating pressure p2, until there is a balance of forces at the regulating valve slide 8. Via the respectively arising force equilibrium that is acting on the regulating valve slide 8, the regulating valve device 3 regulates, within the preset pilot pressure range, the actuation pressure p2 of the shifting element 2 that is preset in each case via the pilot pressure p_VS, where with continuous increase of the pilot pressure p_VS the actuation pressure p2 is increased proportionally.

The shifting element 2 is also to be operated slip-free in predefined operating states of the transmission device by means of the hydraulic system 1 according to FIG. 2. For this purpose, the actuating pressure p2 should be regulated via the regulating valve device 3 only up to a defined pressure level of the pilot pressure p_VS. Furthermore, the actuating pressure p2 of the shifting element 2 should correspond to the system pressure p_sys.

For this purpose, starting from the first shift position shown in FIG. 2, above the defined pilot pressure value of the pilot pressure p_VS, the shifting valve device 4 switches into the second completely opposite shift position thereof, in which the pilot pressure p_VS via the shifting valve device 4 is no longer applied as a pressure signal p14 in the direction of the second effective surface 14 of the regulating valve slide 8. In the second shift position of the shifting valve device 4, the system pressure p_sys present at the shifting tongue 12 of the regulating valve device 3 is transmitted via the shifting tongue 21 of the shifting valve device 4 in the direction of the shifting valve 19 of the shifting valve device 4, and via the further shifting tongue 20 of the shifting valve device 4, in the second shift position of the shifting valve device 4 connected to the shifting tongue 19, is passed through as a pressure signal p14 in the direction of the second effective surface 14 of the regulating valve slide 8 of the regulating valve device 3. The system pressure p_sys acts via the second effective surface 14 of the regulating valve slide 8 counter to the spring force of the spring device 15 and to the system pressure p_sys acting on the differential surface 7 with such a large excess force that the regulating valve slide 8 of the regulating valve device 3 loses the regulating function thereof, and the actuating pressure p2 corresponds to the system pressure p_sys and is present at the shifting element 2. With this, the shifting element 2 in the latter operating state of the hydraulic system 1, according to point 2, also has the full transmission capability thereof and can be operated slip-free.

Figure 3:
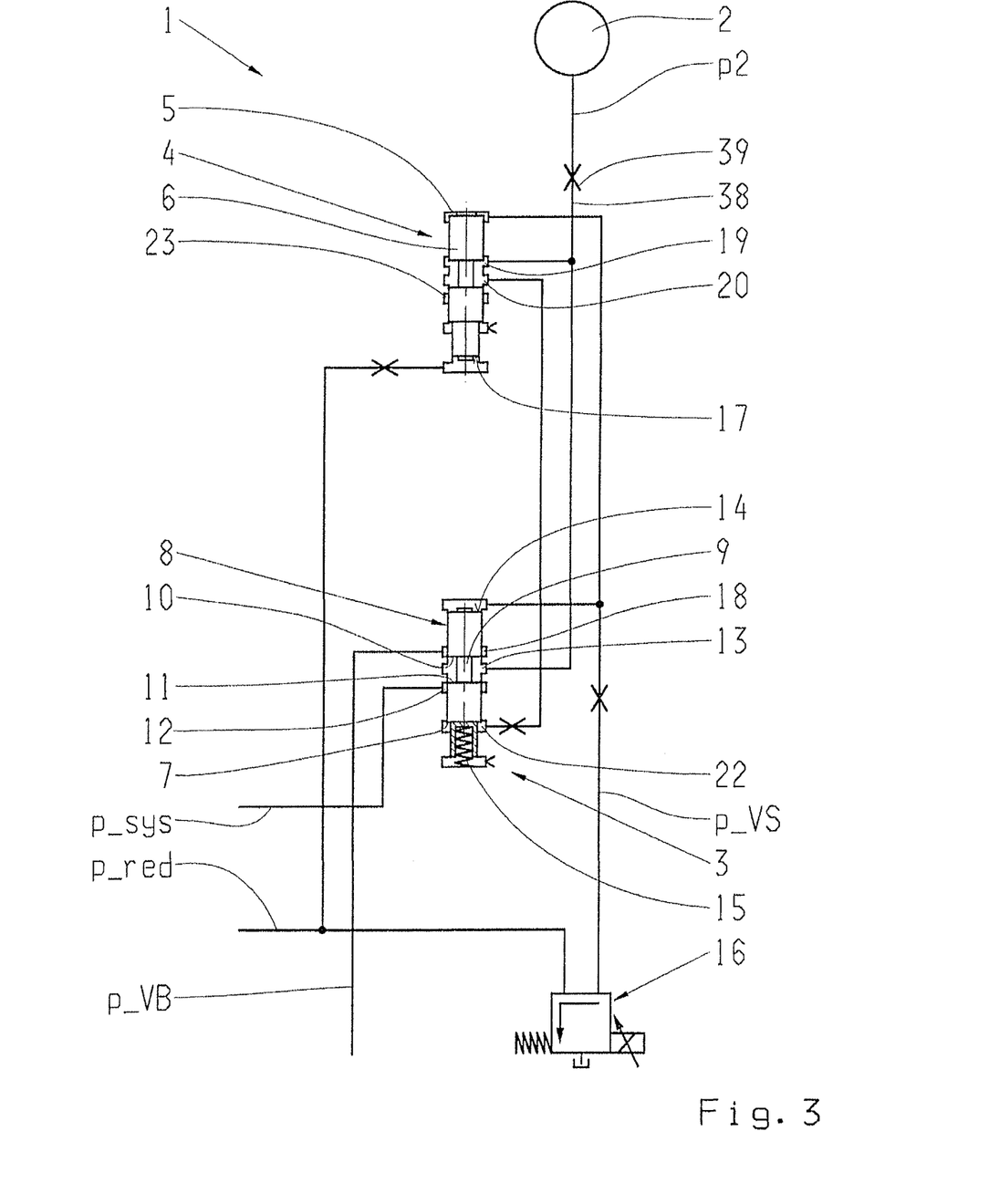
FIG. 3 a representation corresponding to FIG. 1 of a third embodiment of the hydraulic system according to the invention.

FIG. 3 shows a representation corresponding to FIG. 1, of a third example embodiment of the hydraulic system 1, the basic function of which, namely below the predefined pilot pressure value of the pilot pressure p_VS, to adjust the actuating pressure p2 of the shifting element 2 in a controlled manner via the regulating valve device 3, and above the predefined pilot pressure value, to apply the system pressure p_sys, in order to be able to operate the shifting element 2 in an essentially slip-free manner, corresponds to the function of the hydraulic system according to FIG. 1 and FIG. 2. For this reason, the description for FIG. 3 substantially describes only the differences to the hydraulic systems 1 according to FIG. 1 and FIG. 2, and for the remaining function of the hydraulic system 1 according to FIG. 3, reference is made to the preceding description.

In the first shift position, of the shifting valve device 4, shown in FIG. 3, the adjusted actuating pressure p2 of the shifting element 2 that is regulated in the region of the regulating valve device 3, is applied via the shifting tongue 19 and the shifting tongue 20 in the direction of a further shifting tongue 22 of the regulating valve device 3 at the first effective surface 7 of the regulating valve slide 8 in a manner reducing the actuating pressure p2 and in the opposite direction of the pilot pressure p_VS, which is present at the second effective surface 14 of the regulating valve slide 8, whereby the regulating function of the regulating valve device 3 is activated. The diameters of the collars 8A and 8B and the effective surfaces 10 and 11 of the regulating valve slide 8 are of the same size, and the effective surface 7 of the regulating valve slide 8 is provided on a side of the collar 8B facing away from the reduced diameter region 9 of the regulating valve slide 8.

Above the defined pilot pressure value of the pilot pressure p_VS, the shifting valve device 4 is switched out of the first shifting state thereof, shown in FIG. 3, into the second shifting state thereof, in which the shifting tongue 19 of the shifting valve device 4 is separated from the shifting valve slide 6 by the further shifting tongue 20 of the shifting valve device 4. This leads to the fact that the actuating pressure p2 of the shift element 2, via the further shifting tongue 20, is no longer present at the further shifting tongue 22 of the regulating valve device 3, and the pilot pressure p_VS shifts the regulating valve slide 8 completely to the opposite position, against the spring force of the spring device 15. In this completely shifted operating state of the regulating valve device 3, the system pressure p_sys present at the shifting tongue 12 is transmitted with the full amount as an actuating pressure p2 in the direction of the shifting element 2, and the shifting element 2 operates in a slip-free manner. At the same time, the pressure applied at the shifting tongue 22 in the second shift position of the shifting valve device 4 is bled via the shifting tongue 20 and a further shifting tongue 23 connected thereto in the second shift position of the shifting valve device 4, whereby the deactivation of the regulating function of the regulating valve device 3 is not prevented to an undesirable extent.

The spring device 15 of the regulating valve device 3, here in all example embodiments represented in the drawings, is designed as an inner-lying helical spring, saving construction space. In order to further represent the hydraulic systems 1 according to FIG. 1 to FIG. 3 with the most compact construction possible, the regulating valve slide 8 and the shifting valve slide 6, in a manner shown in more detail in FIG. 4 that shows a design of the hydraulic system 1 according to FIG. 1, are disposed in a common boring 24 of the housing 25 of the hydraulic system 1 coaxial to each other and movable in opposing longitudinal directions, and the region of the effective surfaces 5 and 14, or control surfaces, facing toward each other, can be pressurized in the previously described manner via a common pressure chamber 26 with the pilot pressure p_VS representing a pressure signal. A further reduction of the required construction space is achieved in that a pressure regulating valve slide 27 of the pressure regulating device 16 is also disposed coaxial to the shifting valve slide 6 and to the regulating valve slide 8 in the common boring 24.

A stop device 28 is provided as a travel limit in the region of the common pressure chamber 26 between the regulating valve slide 8 and the shifting valve slide 6. By means of the stop device 28, shown in FIG. 5 in a view along section line 5-5 in FIG. 4, it is guaranteed that the regulating valve slide 8 and the shifting valve slide 6 can not be moved beyond the provided displacement path, and thus cannot interact with each other. Furthermore, the stop device 28 guarantees that in the presence of a pilot pressure p_VS equal to zero, the regulating valve slide 8 and the shifting valve slide 6 take on a defined starting position.

Figures 4, 5:
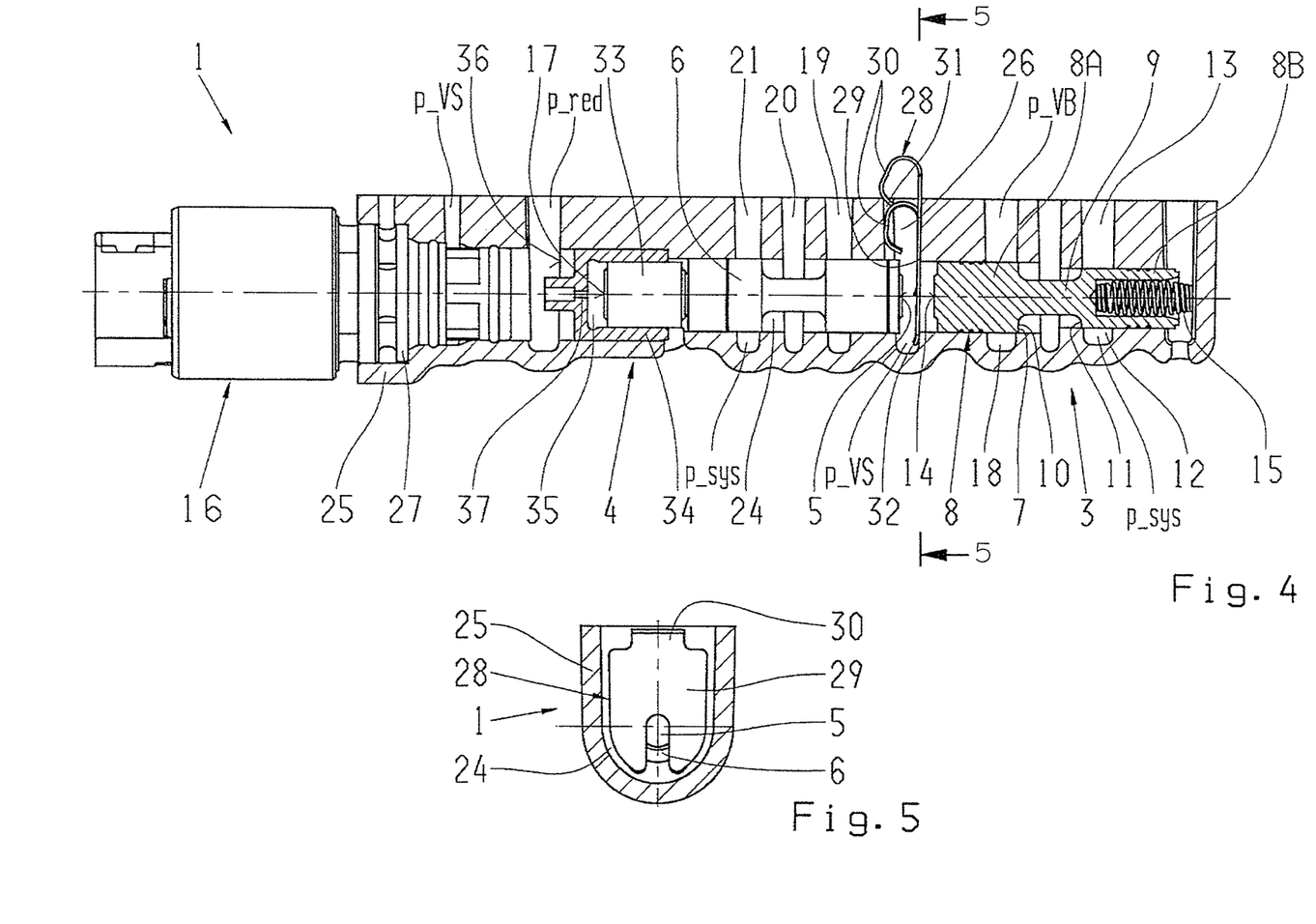
FIG. 4 a detailed representation of a regulating valve device and a shifting valve device of the hydraulic system according to FIG. 1, wherein a regulating valve slide of the regulating valve device and a shifting valve slide of the shifting valve device are disposed coaxially to each other, longitudinally movable in a common boring.
FIG. 5 a stop device for the regulating valve slide and for the shifting valve slide in a stand-alone representation from a view along section line 5-5 designated in FIG. 4.

The stop device 28 here comprises a stop plate 29, which extends in the cross section of the common pressure chamber 26, and is shown in FIG. 4 both in a preassembled position as well as in a final assembled position. In the preassembled position, the stop plate 29 strikes with a spring arm 30 on a pocket edge 31. For the transfer of the stop plate 29 into the final assembly position thereof, a radial force is applied onto the stop plate 29, and is inserted into the common pressure chamber 26, wherein the stop plate 29 in the final assembly position strikes on a pocket surface 32 outside of the sectional plane of the common pressure chamber 26.

The hydraulic system 1 according to FIG. 1 is also implemented in a construction space-saving manner because the shifting valve device 4, in the manner shown more closely in FIG. 4, has an additional piston 33 interacting with the shifting valve slide 4; in the region of the additional piston the effective surface 17 to which the reducing pressure p_red can be applied, is smaller than the effective surface 5 of the shifting valve slide 6. In the region of the shifting valve device 4, by means of the additional piston 33, a transmission ratio of greater than one can be realized between the control surfaces 5 and 17, and by means of the additional piston 33, transverse forces that result from coaxial geometry errors, acting on the shifting valve slide 6, can be nearly eliminated, because pinching due to a radial offset between the axes of symmetry of the shifting valve slide 6 and the additional piston is avoided.

The additional piston 33 is guided in a sealing sleeve 34 coaxial to the shifting valve slide 6 and movable longitudinally. The reducing pressure p_red is present at a face surface 36 of the sealing sleeve 34, and via a channel 37 in the sealing sleeve 34 is applied in the interior of the sealing sleeve 34, and thus applied to the effective surface 17 of the additional piston 33. By means of the adjustable transmission ratio between the effective surface 5 and the effective surface 17, the actuating pressure of the shifting valve device 4 can in a simple manner be designed and adapted to the respective application case.

In all of the example embodiments of the hydraulic system 1 according to the invention shown in the figures, a supply line 38 feeding the actuating pressure p2 of the shifting element 2 is downstream of the regulating valve device 3 and also downstream of the shifting valve device 4 designed having a diaphragm device 39, whereby a temperature-dependent control quality of the actuating pressure p2 of the shifting element 2 is improved, particularly during rapid actuations of the shifting element 2, in a construction space-saving and economical, simple manner in comparison to the solutions known from the prior art.

The use of the hydraulic system according to the invention is limited neither to use in a specific electro-hydraulically controlled transmission or transmission type, nor to use for a specific constructive shifting element embodiment.

Figure 6:
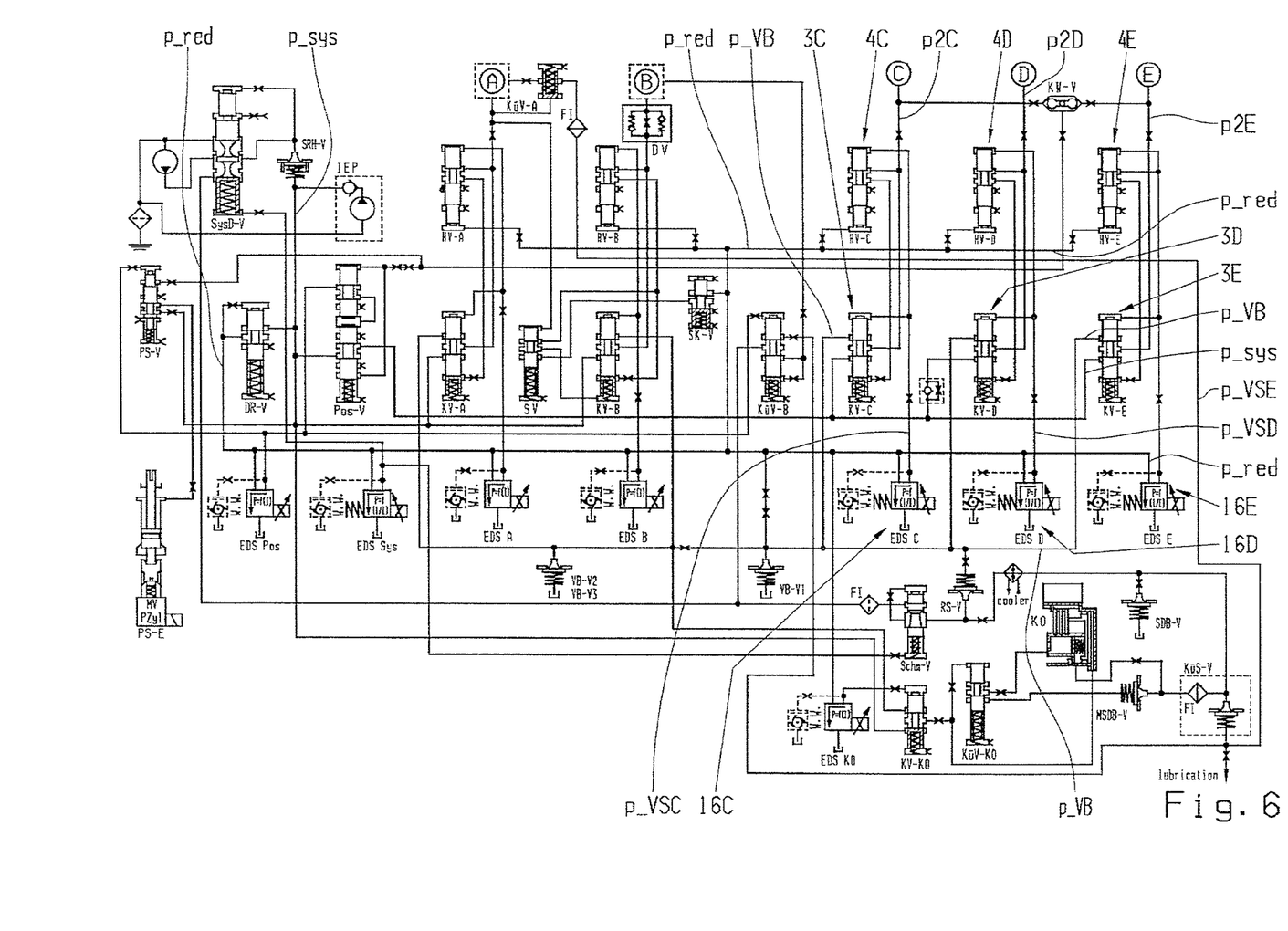
FIG. 6 an example control circuit with a plurality of hydraulic systems according to FIG. 3 for an electro-hydraulically controlled automatic transmission.

As an example of a possible practical application, FIG. 6 shows a control circuit for an electro-hydraulically controlled automatic transmission with five shifting elements, in which a plurality of valve arrangements according to the invention are provided. The five shifting elements, which can be hydraulically actuated independent of each other, are labeled A to D. For each of the three shifting elements C, D and E, there is a separate hydraulic system according to FIG. 3. The control valve device 3C, the shifting valve device 4C and the pressure control device 16C are assigned to the shifting element C, wherein the pilot pressure of this pressure control device 16C is labeled p_VSC and the actuating pressure acting on the shifting element C is labeled p2C. The control valve device 3D, the shifting valve device 4D and the pressure control device 16D are assigned to the shifting element D, wherein the pilot pressure of this pressure control device 16D is labeled p_VSD and the actuating pressure acting on the shifting element D is labeled p2D. The control valve device 3E, the shifting valve device 4E and the pressure control device 16E are assigned to the shifting element E, wherein the pilot pressure of this pressure control device 16E is labeled p_VSE and the actuating pressure acting on the shifting element E is labeled p2E. Valve systems that are derived from the hydraulic system according to FIG. 3 are also provided for the hydraulic control of the two shifting elements A and B.

REFERENCE CHARACTERS 1 hydraulic system
2 shifting element
3, 3C, 3D, 3E regulating valve device
4, 4C, 4D, 4E shifting valve device
5 first effective surface of the shifting valve slide of the shifting valve device
6 shifting valve slide
7 first effective surface of the regulating valve slide of the regulating valve device
8 regulating valve slide of the regulating valve device
8A, 8B collar of the regulating valve slide of the regulating valve device
9 reduced diameter region
10, 11 effective surface
12, 13 shifting tongue
14 second effective surface of the regulating valve slide of the regulating valve device
15 spring device
16, 16C, 16D, 16E pressure regulating device
17 effective surface of the shifting valve slide
18 further shifting tongues of the regulating valve device
19 shifting tongue of the shifting valve device
20 further shifting tongue of the shifting valve device
21 further shifting tongue of the shifting valve device
22 shifting tongue of the regulating valve device
23 shifting tongue of the shifting valve device
24 common boring
25 housing
26 common pressure chamber
27 pressure regulator, valve slide
28 stop device
29 stop plate
30 spring arm
31 pocket edge
32 pocket surface
33 additional piston
34 sealing sleeve
35 boring of the sealing sleeve
36 face surface of the sealing sleeve
37 channel of the sealing sleeve
38 supply line of the shifting element
39 diaphragm device
p2, p2C, p2D, p2E actuating pressure
p14 pressure signal
p_red reducing pressure
p_sys system pressure
p_VB prefill pressure
p_VS, p_VSC, p_VSD, pVSE pilot pressure
A, B, C, D, E shifting elements of an automatic transmission

The invention claimed is:

1. A hydraulic system (1), for actuating at least one shifting element (2) of a transmission, comprising:
a regulating valve device (3) that can be preset and having a regulating valve slide (8), an axial end face of the regulating valve slide is a control surface, and
a shifting valve device (4) interacting with the shifting element (2) that can also be preset and having a shifting valve slide (6), an axial end face of the shifting valve slide is a control surface,
the regulating valve slide (8) and the shifting valve slide (6) being disposed in a common boring (24) of a housing (25) coaxial with respect to one another along a longitudinal axis and movable in opposing longitudinal directions and a common pressure chamber (26) is axially defined by the control surface of the regulating valve slide and the control surface of the shifting valve slide, the common pressure chamber can be pressurized with a pilot pressure signal (p_VS) thereby applying a force on the control surfaces of the regulating and shifting valve slides,
the regulating valve slide (8) and the shifting valve slide (6) are each maintained in a defined starting position when the hydraulic system is in a pressureless operating state.

2. The hydraulic system according to claim 1, wherein the regulating valve slide (8) and the shifting the valve slide (6) are each held, via a stop device (28), in the defined starting position thereof which they occupy in the pressureless operating state of the hydraulic system (1).

3. The hydraulic system according to claim 1, wherein a spring device applies a return spring force on the regulating valve slide to bias the regulating valve slide in a direction of the defined starting position thereof and the common pressure chamber.

4. The hydraulic system according to claim 1, wherein a further pressure signal (p_red) is applied to the shifting valve slide (6) which biases the shifting valve slide in a direction of the defined starting position thereof.

5. The hydraulic system according to claim 4, wherein the further pressure signal (p_red) is applied in a region of an effective surface (17) of an additional piston (33) disposed in the common boring (24), axially movable and coaxial to the shifting valve slide (6) and which is brought into effective connection with the shifting valve slide (6).

6. The hydraulic system according to claim 5, wherein the additional piston (33) is provided in a sealing sleeve (34) which is provided in the common boring (24), and is impinged with the further pressure signal (p_red) via a channel (37) of the sealing sleeve (34).

7. The hydraulic system according to claim 1, wherein an actuating pressure (p2) of the shifting element (2) is regulated via the regulating valve device (3) within a defined pilot pressure range and with a presence of a first shift state of the shifting valve device (4), and the shifting valve device (4), above a pilot pressure value that is applied to a first effective surface (5) of the shifting valve slide of the shifting valve device, has a second shift state, at which the actuating pressure (p2) of the shifting element corresponds to a system pressure (p_sys) that is applied to the regulating valve device (3).

8. The hydraulic system according to claim 1, wherein an actuating pressure (p2) of the shift element (2) is applied to a first effective surface (7) of the regulating valve slide (8) of the regulating the device (3) in an effective direction reducing the actuating pressure (p2).

9. The hydraulic system according to claim 8, wherein the first effective surface (7) of the regulating valve slide (8), to which the actuating pressure (p2) is applied, is a differential surface between two effective surfaces (10, 11) of the regulating valve slide (8), delimiting a reduced diameter range (9) of the regulating valve slide (8) in an axial direction, by which the actuating pressure (p2) is set jointly with shifting tongues (12, 13).

10. The hydraulic system according to claim 7, wherein in the presence of the second shift state of the shifting valve device (4), a total force component, corresponding to at least a sum of a first force component equivalent to a pressure signal (p14) present at a second effective surface (14) of the regulating valve slide (8) and a second force component equivalent to the actuating pressure (p2) present at the first effective surface (7) of the regulating valve slide (8), acts on the regulating valve slide (8), guiding the regulating valve slide (8) of the regulating valve device (3) in the direction of a position in which the actuating pressure (p2) is the same as the system pressure (p_sys).

11. The hydraulic system according to claim 7, wherein the second shifting state of the shifting of device (4), the actuating pressure (p2) of the shifting element (2) is fed back, as a pressure signal (p14), from the regulating valve device (3), via the shifting valve device (4), to a second effective surface (14) of the regulating valve slide (8) of the regulating valve device (3).

12. The hydraulic system according to claim 7, wherein in the second shifting state of the shifting valve device (4), the system pressure (p_sys) is present as a pressure signal at a second effective surface (14) of the regulating valve slide (8) of the regulating valve device (3).

13. The hydraulic system according to claim 7, wherein in the second shifting state of the shifting valve device (4), either the actuating pressure (p2) of the shifting element (2) or the pilot pressure (p_VS) of the regulating valve device are present as a pressure signal at the second effective surface (14) of the regulating valve slide (8) of the regulating valve device (3).

14. The hydraulic system according to one claim 1, wherein the pilot pressure (p_VS) of the shifting valve device (4) and the regulating valve device (3) is adjustable via a common pressure regulating device (16).

15. The hydraulic system according to claim 14, wherein a pressure regulating valve slide (27) of the common pressure regulating device (16) is disposed coaxial, in the common boring (24), with respect to the shifting valve slide (6) and to the regulating valve slide (8).

16. A hydraulic system for actuating at least one shifting element of a transmission, the hydraulic system comprising:

a regulating valve device,
a shifting valve device which interact with one another and are presetable,
the regulating valve device having a regulating valve slide with a control surface and the shifting valve device having a shifting valve slide with a control surface,
the regulating valve device and the shifting valve device being coaxially arranged with one another within a common boring of a housing of the hydraulic system and being movable in opposite longitudinal directions,
the control surface of the shifting valve slide and the control surface of the regulating valve slide face one another within the common boring and define a common pressure chamber therebetween, and the common pressure chamber is pressurized with a pilot pressure signal.

17. The hydraulic system according to claim 16, wherein the regulating valve slide (8) and the shifting the valve slide (6) are each held, via a stop device (28), in a defined starting position thereof which they occupy in a pressureless operating state of the hydraulic system (1).

18. The hydraulic system according to claim 16, wherein a return spring force, which acts in a direction of the defined starting position thereof, is applied to the regulating valve slide (8) via a spring device (15).

19. The hydraulic system according to claim 16, wherein a further pressure signal (p_red) is applied to the shifting valve slide (6) which acts in a direction of the defined starting position thereof; and the further pressure signal (p_red) is applied in a region of an effective surface (17) of an additional piston (33) disposed in the common boring (24), axially movable and coaxial to the shifting valve slide (6) and which is brought into effective connection with the shifting valve slide (6).

* * * * *